United States Patent
Hersey et al.

(10) Patent No.: US 7,517,450 B2
(45) Date of Patent: Apr. 14, 2009

(54) PRE-ASSEMBLED FLOW CONTROL STRUCTURED AND RELATED MEDIA FILTRATION SYSTEM

(75) Inventors: Christopher S. Hersey, South Portland, ME (US); Gregory W. Byrne, Jr., Tualatin, OR (US); Daniel W. Aberle, Portland, OR (US)

(73) Assignee: Contech Stormwater Solutions Inc., West Chester, OH (US)

( * ) Notice: Subject to any disclaimer, the term of this patent is extended or adjusted under 35 U.S.C. 154(b) by 0 days.

(21) Appl. No.: 11/746,238

(22) Filed: May 9, 2007

(65) Prior Publication Data

US 2008/0277326 A1  Nov. 13, 2008

(51) Int. Cl.
*E03F 5/14* (2006.01)

(52) U.S. Cl. .................. 210/155; 210/162; 210/170.03; 210/323.2; 210/434

(58) Field of Classification Search ................. 210/155, 210/162, 163, 170.03, 254, 323.1, 323.2, 210/434, 747, 790
See application file for complete search history.

(56) References Cited

U.S. PATENT DOCUMENTS

| | | | | |
|---|---|---|---|---|
| 272,881 | A | * | 2/1883 | Houghton ................. 210/323.2 |
| 5,433,845 | A | * | 7/1995 | Greene et al. ........... 210/170.03 |
| 5,707,527 | A | * | 1/1998 | Knutson et al. ......... 210/170.03 |
| 6,077,423 | A | | 6/2000 | Roy et al. |
| 6,077,448 | A | * | 6/2000 | Tran-Quoc-Nam et al. .. 210/254 |
| 6,171,507 | B1 | | 1/2001 | Roy et al. |
| 6,231,758 | B1 | | 5/2001 | Morris et al. |
| 6,251,269 | B1 | | 6/2001 | Johnson et al. |
| 6,350,374 | B1 | | 2/2002 | Stever et al. |
| 6,524,473 | B2 | * | 2/2003 | Williamson ............. 210/170.03 |
| 6,533,941 | B2 | | 3/2003 | Butler |
| 6,638,424 | B2 | | 10/2003 | Stever et al. |
| 6,649,048 | B2 | * | 11/2003 | de Ridder et al. ....... 210/170.03 |
| 6,793,811 | B1 | * | 9/2004 | Fleischmann ................ 210/163 |
| 6,998,038 | B2 | | 2/2006 | Howard |
| 7,001,527 | B2 | | 2/2006 | Stever et al. |
| 2003/0094407 | A1 | | 5/2003 | de Ridder et al. |
| 2006/0016767 | A1 | * | 1/2006 | Olson et al. .............. 210/323.2 |
| 2006/0207922 | A1 | | 9/2006 | Dussich |

FOREIGN PATENT DOCUMENTS

| | | |
|---|---|---|
| WO | 97/41068 | 11/1997 |
| WO | 2005/012183 | 2/2005 |

OTHER PUBLICATIONS

PCT, International Search Report and Written Opinion issued regarding PCT/US2008/061410 (Jul. 21, 2008).

* cited by examiner

*Primary Examiner*—Christopher Upton
(74) *Attorney, Agent, or Firm*—Thompson Hine LLP

(57) ABSTRACT

A stormwater filtration system includes a stormwater containment structure including a concrete floor and a pre-assembled flow structure embedded in the concrete floor. The pre-assembled flow structure includes an inlet compartment housing, an outlet compartment housing and at least one filter conduit positioned between the inlet compartment housing and the outlet compartment housing and in flow communication with the interior of the outlet compartment housing. At least one bypass conduit extends from the inlet compartment housing to the outlet compartment housing for delivering water from the interior of the inlet compartment housing to the interior of the outlet compartment housing. A plurality of filter units are connected to the filter conduit so that stormwater filtered by the filter units passes into the filter conduit and then to the interior of the outlet compartment housing.

32 Claims, 9 Drawing Sheets

PRE-ASSEMBLED FLOW CONTROL STRUCTURED AND RELATED MEDIA FILTRATION SYSTEM

TECHNICAL FIELD

The present application relates generally to systems for treating stormwater and more particularly to a pre-assembled flow control structure and related media filtration system.

BACKGROUND

Stormwater is pure rainwater plus any particulate debris and dissolved materials that the rainwater may entrain as it traverses a surface. In urban areas, rain that falls on the roofs of buildings, collects on paved areas like driveways, roads, runways and sidewalks is typically diverted through a system of pipes, catch basins, etc. that is separate from the sewerage system. Unlike sewage, stormwater historically has not been treated, but flowed directly from streets and gutters into natural bodies of water, e.g., rivers, lakes and the ocean.

Stormwater can therefore be a form of diffuse or non-point source pollution. It can entrain pollutants, such as garbage, sediment, organic matter, heavy metals, and organic toxins, and transport them into receiving natural bodies of water. As a consequence, natural bodies of water that receive stormwater may also receive the pollutants.

The amount of stormwater pollution entering into such receiving bodies of water is related to the degree of urbanization in the surrounding area and the nature of the surrounding activities. Urbanization results in the covering of land with structures of various permeabilities, such as roadways, parking lots, and rooftops, which both generate large volumes of stormwater and accumulate pollutants. Since some of these surfaces do not allow rainfall to infiltrate, they allow the accumulated pollutants to be carried into stormwater drainage systems.

In an effort to address the environmental problems posed by polluted stormwater, systems which may include traps and filters for stormwater have been developed. For example, a filter apparatus described in U.S. Pat. No. 6,027,639 features a siphon-inducing mechanism. The filter apparatus of the '639 patent utilizes a sealed upper housing that includes a check valve for air evacuation within the housing. An induced siphon effect pulls stormwater through the filter until air is pulled through an air inlet along the lower perimeter of the housing, disrupting the siphon.

It has been recognized that elevated levels of pollutants can be carried by stormwater during an initial, site construction phase. Such elevated levels of pollutants can block filters thereby preventing stormwater filtering. As a result, regulations may allow for bypassing of stormwater filters during the site construction phase.

SUMMARY

In an aspect, a stormwater filtration system includes a stormwater containment structure including a concrete floor and a pre-assembled flow structure embedded in the concrete floor. The pre-assembled flow structure includes an inlet compartment housing, an outlet compartment housing and at least one filter conduit positioned between the inlet compartment housing and the outlet compartment housing and in flow communication with the interior of the outlet compartment housing. At least one bypass conduit extends from the inlet compartment housing to the outlet compartment housing for delivering water from the interior of the inlet compartment housing to the interior of the outlet compartment housing. A plurality of filter units are connected to the filter conduit so that stormwater filtered by the filter units passes into the filter conduit and then to the interior of the outlet compartment housing.

In another aspect, a flow assembly for use in forming a floor of a stormwater filtration chamber for containing multiple filter units is provided. The flow assembly includes a first housing forming a stormwater inlet compartment, a second housing forming a stormwater outlet compartment and a plurality of filter conduits. Each filter conduit has a first end connected to the first housing in a manner that prevents stormwater from flowing from the inlet compartment into the first end and a second end connected to the second housing in a manner that permits stormwater to flow from the second end into the outlet compartment. A plurality of filter connection point structures extend upwardly from the filter conduit. A plurality of bypass conduits have a first end connected to the first housing in a manner that permits stormwater to flow from the inlet compartment into the first end and a second end connected to the second housing in a manner that permits stormwater to flow from the second end into the outlet compartment.

In a third aspect, a method of manufacturing a stormwater filtration chamber is provided. The method includes producing a flow assembly having a first housing forming a stormwater inlet compartment and a second housing forming a stormwater outlet compartment. At least one filter conduit has a first end and a second end, where the first end is connected to the first housing in a manner that prevents stormwater from flowing from the inlet compartment into the first end and the second end is connected to the second housing in a manner that permits stormwater to flow from the second end into the outlet compartment. The filter conduit further includes a plurality of filter connection point structures extending therefrom. At least one bypass conduit having a first end and a second end is provided. The first end of the bypass conduit is connected to the first housing in a manner that permits stormwater to flow from the inlet compartment into the first end, and the second end is connected to the second housing in a manner that permits stormwater to flow from the second end into the outlet compartment. The flow assembly is embedded in concrete to produce a floor for the filtration chamber.

In a fourth aspect, a stormwater treatment system includes a stormwater containment structure including a floor. A pre-assembled flow control structure forms at least part of the floor. The pre-assembled flow control structure includes an inlet portion, an outlet portion and a treatment region extending between the inlet portion and the outlet portion. The treatment region includes a filter conduit for directing filtered stormwater toward the outlet portion and a bypass conduit for directing unfiltered stormwater from an inlet reservoir at the inlet portion toward the outlet portion. Filter cartridges are connected to the filter conduit and in communication therewith so that filtered stormwater exiting the filter cartridges flows into the filter conduit and is directed toward the outlet portion.

The details of one or more embodiments are set forth in the accompanying drawings and the description below. Other features, objects, and advantages will be apparent from the description and drawings, and from the claims.

DETAILED DESCRIPTION

Figure 1:
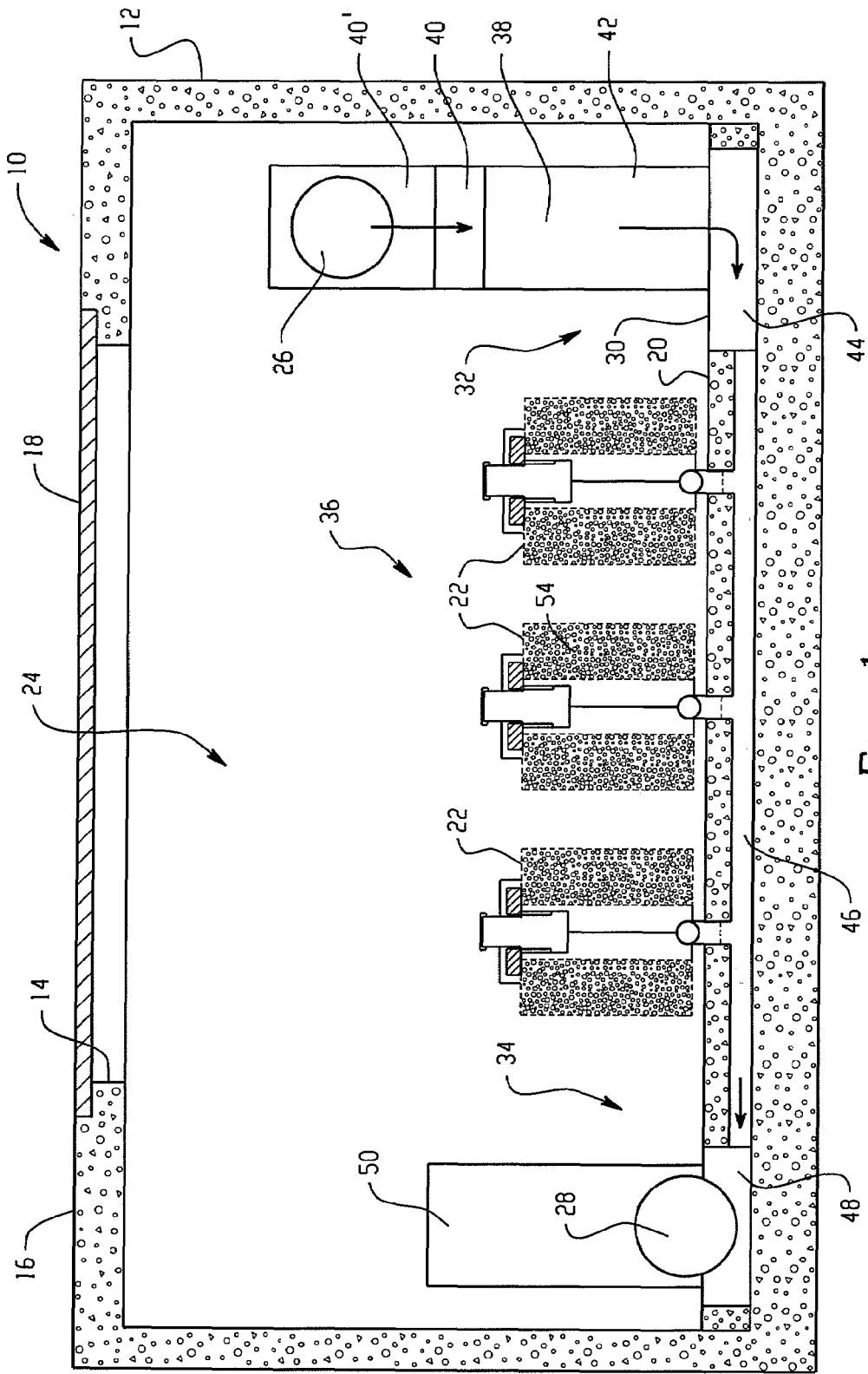
FIG. 1 is a diagrammatic, section view of an embodiment of a stormwater treatment system including pre-assembled flow control structure in an initial, bypass configuration.

Referring to FIG. 1, a stormwater treatment system 10 includes a vault 12 having an access opening 14 at a top 16 of the vault through which access can be gained to an interior 24 of the vault (e.g., by removing cover 18) and a floor 20 that, in the illustrated embodiment, is formed of concrete. The stormwater treatment system 10 further includes an inlet 26 through which stormwater enters the vault 12 and an outlet 28 through which stormwater exits the vault. A manifold of filter assemblies 22 are located in the interior 24 of the vault 12 for use in filtering stormwater entering through the inlet. The filter assemblies 22 are connected to and in communication with a pre-assembled flow control structure 30 that directs filtered stormwater toward the outlet 28. The pre-assembled flow control structure 30 includes an inlet region 32, an outlet region 34 and a primary treatment region 36 extending between the inlet and outlet regions. The pre-assembled flow control structure 30 is incorporated into the concrete of the floor 20 thereby being an integral part of the floor.

The pre-assembled flow control structure 30 of FIG. 1 is shown in an initial, bypass configuration where stormwater bypasses the filter assemblies 22, for example, during a site construction phase. The pre-assembled flow control structure 30 includes an inlet conduit 38 in communication with the inlet 26. The inlet conduit 38 includes a removable upper section 40, 40' that can be separated from a lower section 42. The lower section 42 of the inlet conduit 38 may be connected to an inlet reservoir 44 that receives stormwater from the inlet conduit. A filter conduit 46 is connected to the inlet reservoir 44 at a first end and is connected to an outlet reservoir 48 at a second, opposite end. The outlet reservoir 48 receives stormwater from the filter conduit 46, which then flows out of the vault 12 through the outlet 28. A overflow conduit 50 is connected to the outlet reservoir 48. In this initial, bypass configuration, the overflow conduit 50 may be closed so that stormwater cannot flow out of or into the overflow conduit.

In the initial configuration, stormwater enters through the inlet 26, flows directly into the inlet conduit 38 and into the inlet reservoir 44. From the inlet reservoir 44, the stormwater enters the filter conduit 46 (or other conduit) and flows to the outlet reservoir 48. The stormwater then exits through the outlet 28 from the outlet reservoir 48. This initial bypass configuration allows for stormwater to bypass the filter conduits, for example, during a site construction phase when the amount of sediment and other particles in the stormwater can be relatively elevated. Additionally, bypass structure is located within the vault 12 as opposed to external of the vault, which can reduce cost as there may be no need for additional pipes and other structures and less concrete used.

Figure 2:
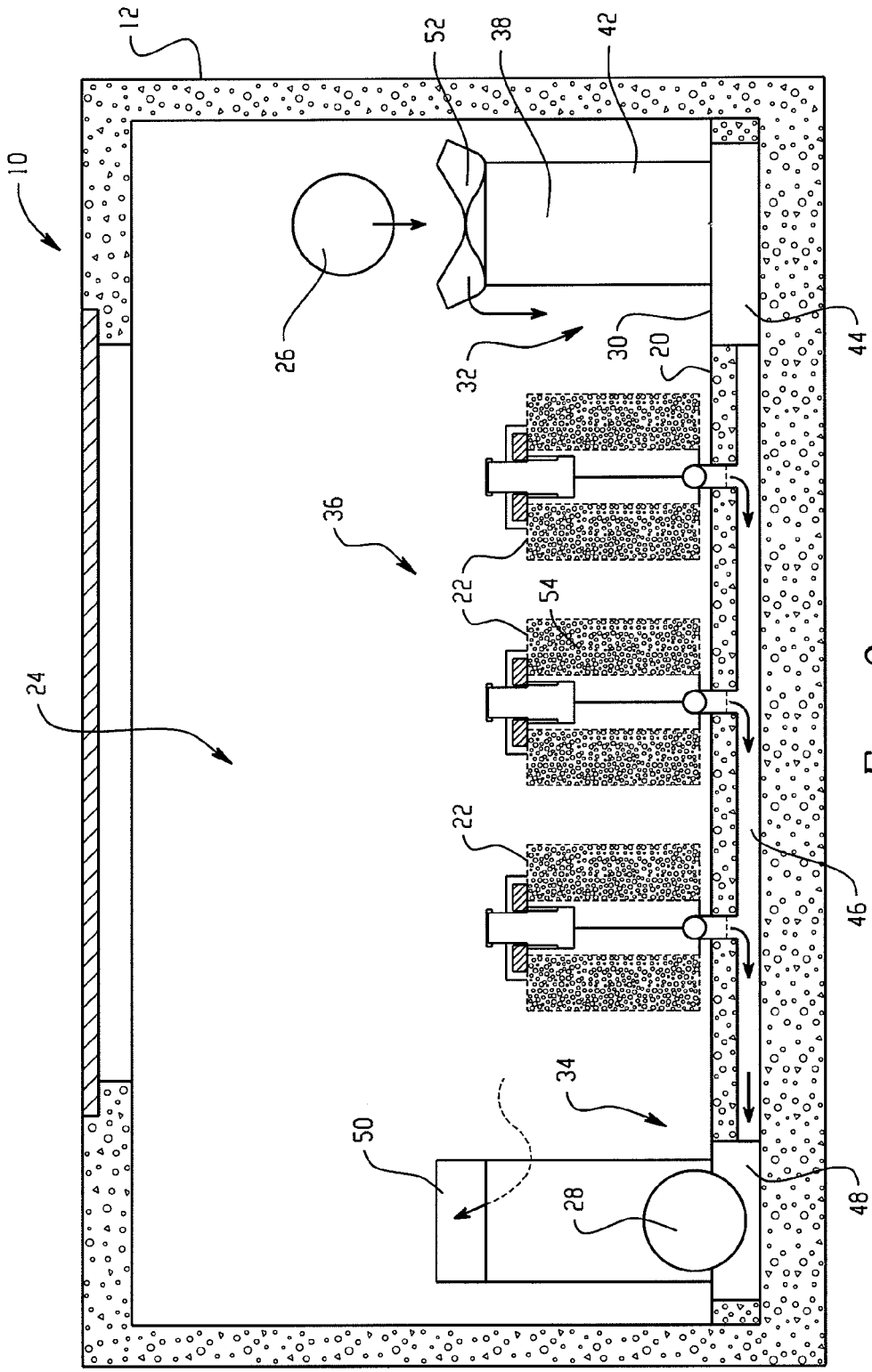
FIG. 2 is a diagrammatic section view of the stormwater treatment system of FIG. 1 with the pre-assembled flow control structure in a filtering configuration.

Referring to FIG. 2, the pre-assembled flow control structure is shown in a filtering configuration. In this filtering configuration, the upper section 40, 40' of the inlet conduit 38 is removed and an energy dissipator structure 52 is connected to the inlet conduit. The energy dissipator structure 52 prevents stormwater from entering the lower section 42 of the inlet conduit 38 and disperses the energy of the stormwater as it comes into contact with the dissipator structure. In some embodiments, the overflow conduit 50 is opened to allow stormwater to bypass the filter assemblies 22 when the water level reaches a bypass elevation within the vault 12.

In the filtering configuration, stormwater enters through the inlet 26 and falls onto the dissipator structure 52. The dissipator structure 52 disperses the energy of the stormwater as it falls and directs the stormwater toward the primary treatment region 36 of the pre-assembled flow control structure 30. The stormwater then enters the filter assemblies 22 and is filtered as the stormwater moves through filter media 54. The filtered stormwater then exits the filter assemblies 22 and enters the filter conduit 46 where the filtered stormwater is directed to the outlet reservoir 48 and outlet 28. During more severe storm events, the stormwater level within the vault 12 may rise to the bypass elevation. In these instances, some stormwater may flow into the overflow conduit 50 and into the outlet 28, thereby bypassing the filter assemblies 22.

Figure 3:
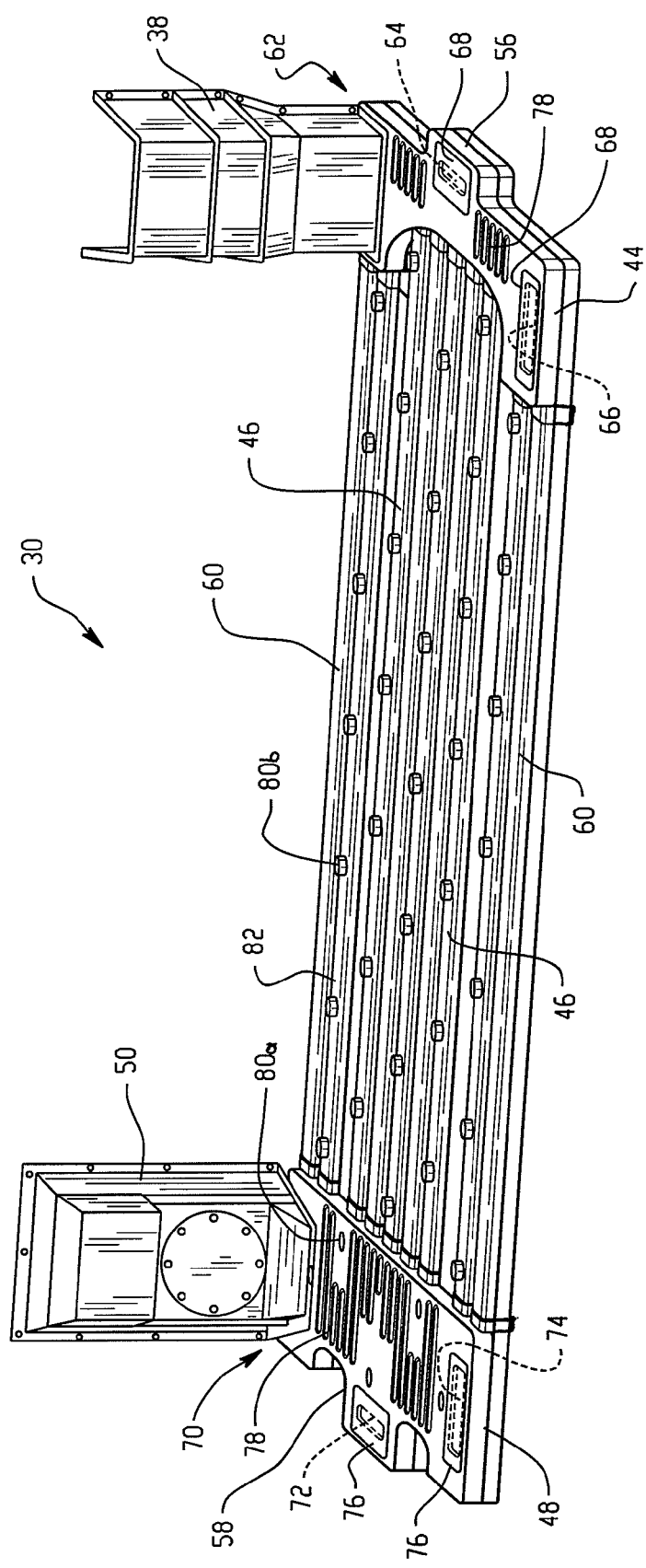
FIG. 3 is a perspective view of the pre-assembled flow control structure of FIG. 1 in isolation.

Referring now to FIG. 3, the pre-assembled flow control structure 30 is shown in isolation, for example, prior to incorporating the pre-assembled flow control structure into concrete and connecting the filter assemblies 22. The pre-assembled flow control structure 30 includes an inlet reservoir housing 56 having the inlet reservoir 44, an outlet reservoir housing 58 having the outlet reservoir 48 and conduits including the filter conduits 46 and bypass conduits 60 connecting the inlet reservoir housing and the outlet reservoir housing. The inlet conduit 38 is connected to the inlet reservoir housing 56 at a side portion 62, for example, to accommodate a vault inlet that is located thereby. However, the pre-assembled flow control structure 30 is configured to accommodate different configurations by including multiple openable connection locations 64 and 66. Each connecting location 64, 66 includes a removable cover 68 that, once removed, exposes an opening to the inlet reservoir 44 and allows for connection of the inlet conduit 38 to the corresponding connection location. Similarly, the overflow conduit 50 is connected to the outlet reservoir housing 58 at a side portion 70 to accommodate the vault outlet. However, the pre-assembled flow control structure 30 is configured to accommodate different configurations by including multiple openable connection locations 72 and 74 that also include removable covers 76. Once the removable covers 76 are removed, an opening is exposed to the outlet reservoir 48 that allows for connection of the bypass conduit thereto, for example, to accommodate a vault outlet located thereby. In some embodiments, the inlet conduit 38 and the overflow conduit 50 may not be part of the pre-assembled flow control structure 30 and may be connected to the inlet and outlet reservoir housings 56 and 58 after the pre-assembled flow control structure is embedded in concrete.

The inlet reservoir housing 56 and the outlet reservoir housing 58 each include detents 78 for providing increased strength. In some embodiments, one or both of the inlet and outlet reservoir housings 56 and 58 include deck stub mounting holes 80a for connecting a filter assembly 22 thereto. Providing the inlet and/or outlet reservoir housings 56, 58 with deck stub mounting holes 80a can increase the number of filter assemblies that can be placed within the vault, which can increase the throughput of filtered stormwater through the treatment system.

Each filter conduit 46 includes deck stub mounts 80b that extend vertically upward from an upper surface 82 of the filter conduit. In the illustrated embodiment, the filter conduits (and the bypass conduits 60) are rectangular in cross-section, however, they may be any other suitable shape such as circular in cross-section. The deck stub mounts 80b are used to connect a filter assembly 22 thereto. In some embodiments, the filter conduits 46 are used to direct only filtered stormwater passing through the filter assemblies 22 to the outlet reservoir 48 with the pre-assembled flow control structure 30 in the filtering configuration. In other embodiments, the filter conduits may direct unfiltered stormwater to the outlet reservoir 48 during the initial bypass configuration. As can be seen, none of the bypass conduits 60 include the deck stub mounts 80b. In some embodiments, the bypass conduits 60 are used to direct stormwater to the outlet reservoir 48 only during the initial, bypass configuration. In other embodiments, the bypass conduits 60 may direct filtered stormwater to the outlet reservoir 48 with the pre-assembled flow control structure 30 in the filtering configuration.

Figure 4:
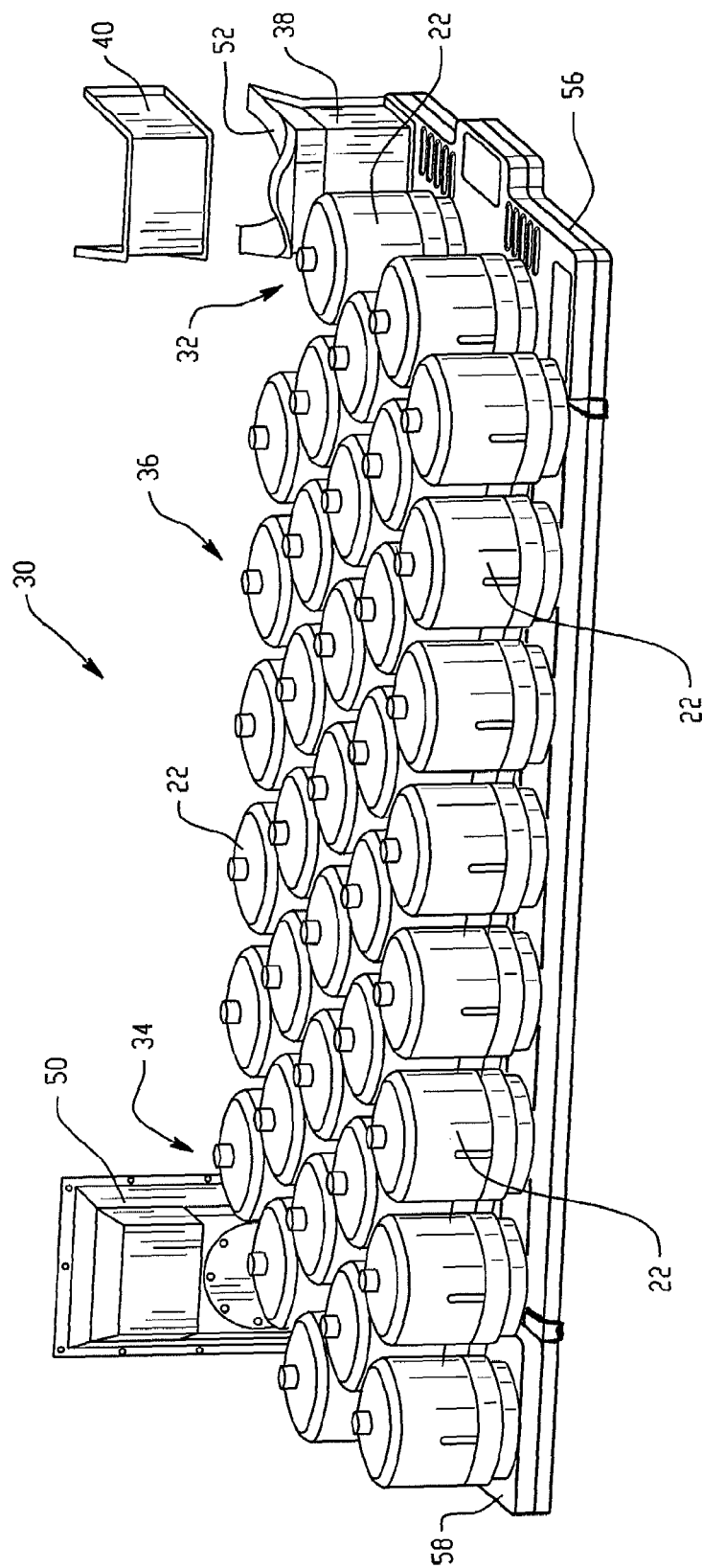
FIG. 4 is a perspective view of the pre-assembled flow control structure of FIG. 3 with filter assemblies connected thereto and being changed to its filtering configuration.

Referring now to FIG. 4, the pre-assembled flow control structure 30 is shown with filter assemblies 22 connected thereto. Also, in FIG. 4, the pre-assembled flow control structure 30 is shown being converted from its initial, bypass configuration to its filtering configuration by removing the upper section 40' of the inlet conduit 38 and attaching the flow dissipator structure 52. As noted above, the filter assemblies 22 are not confined only to the primary treatment region 36, but may also be located in the inlet and outlet regions 32 and 34. Use of the inlet conduit 38, the overflow conduit 50, inlet reservoir housing 56 and outlet reservoir housing 58 eliminates need for baffling structures, for example, to define a forebay and an overflow bay by dividing the vault into separate volumes.

Figure 5:
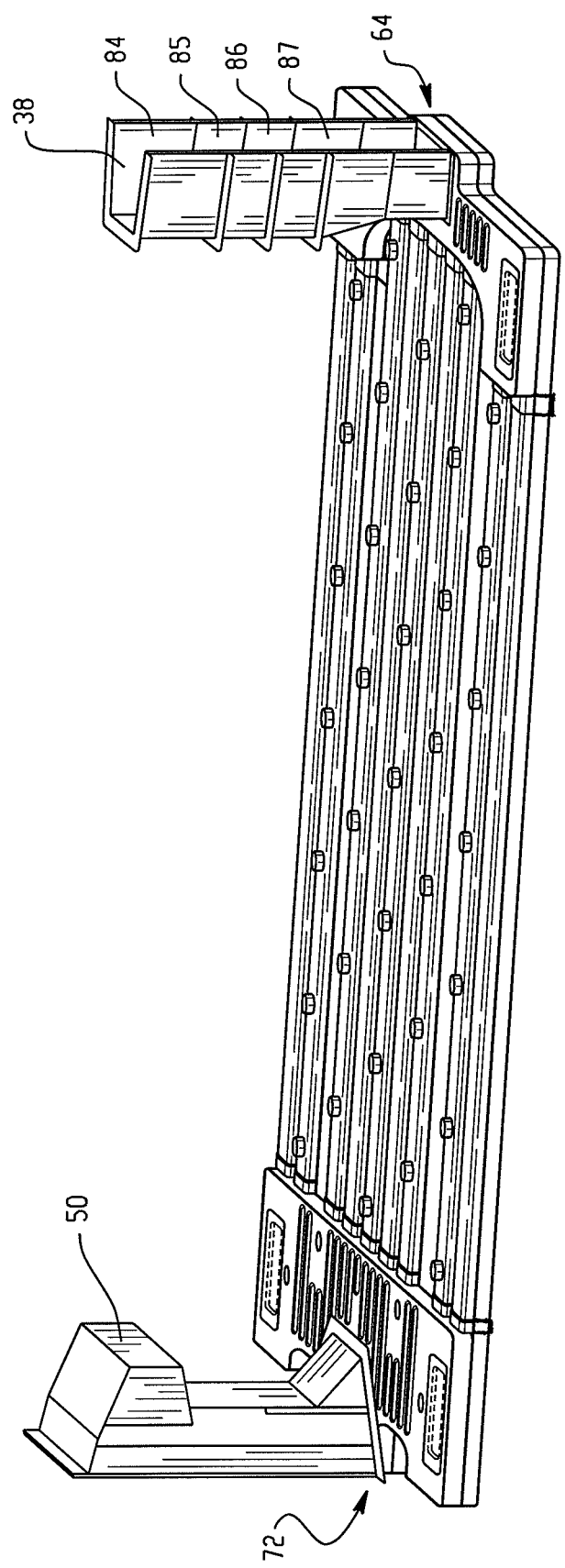
FIGS. 5 and 6 are perspective views of the pre-assembled flow control structure of FIGS. 3 and 4 in a different configuration.
Figure 6:
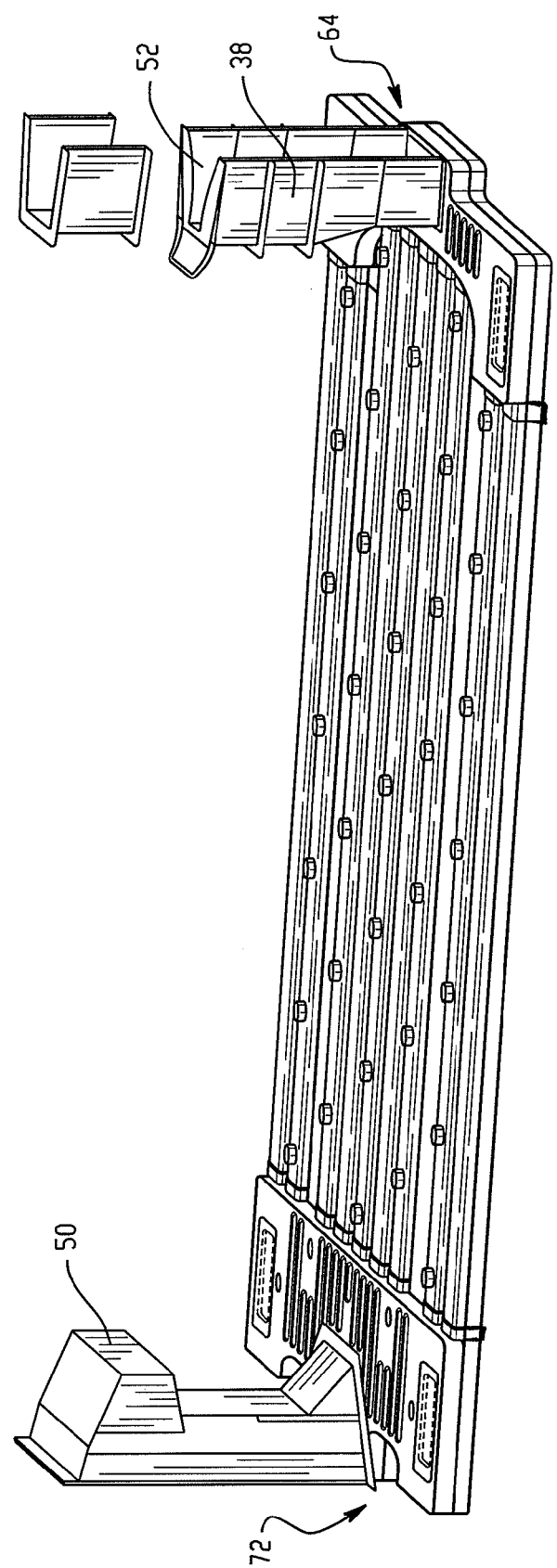

FIGS. 5 and 6 illustrate a different pre-assembled flow control structure configuration where the inlet and overflow conduits 38 and 50 are at end locations 64 and 72, respectively. Additionally, a height of the inlet conduit 38 and/or outlet conduit 50 is increased, for example, to accommodate taller filter assembly 22 heights, for example, as compared to the configuration of FIG. 4. Increasing the height of the inlet conduit 38 can be accomplished, for example, through the addition of conduit sections 84-87.

The pre-assembled flow control structure 30 may be formed by any suitable method. As one example, the inlet reservoir housing 56, the outlet reservoir housing 58 and the conduits 46, 60 are formed separately and then connected together. The inlet and outlet reservoir housings 56, 58 may be molded from a suitable plastic material such as ABS and the conduits 46, 60 may be molded or extruded from the same or a different plastic material such as PVC. The flow control structure 30 is "pre-assembled" in that it can be fully assembled before it is incorporated into the concrete of the vault floor thereby being an integral part of the floor.

Figure 7:
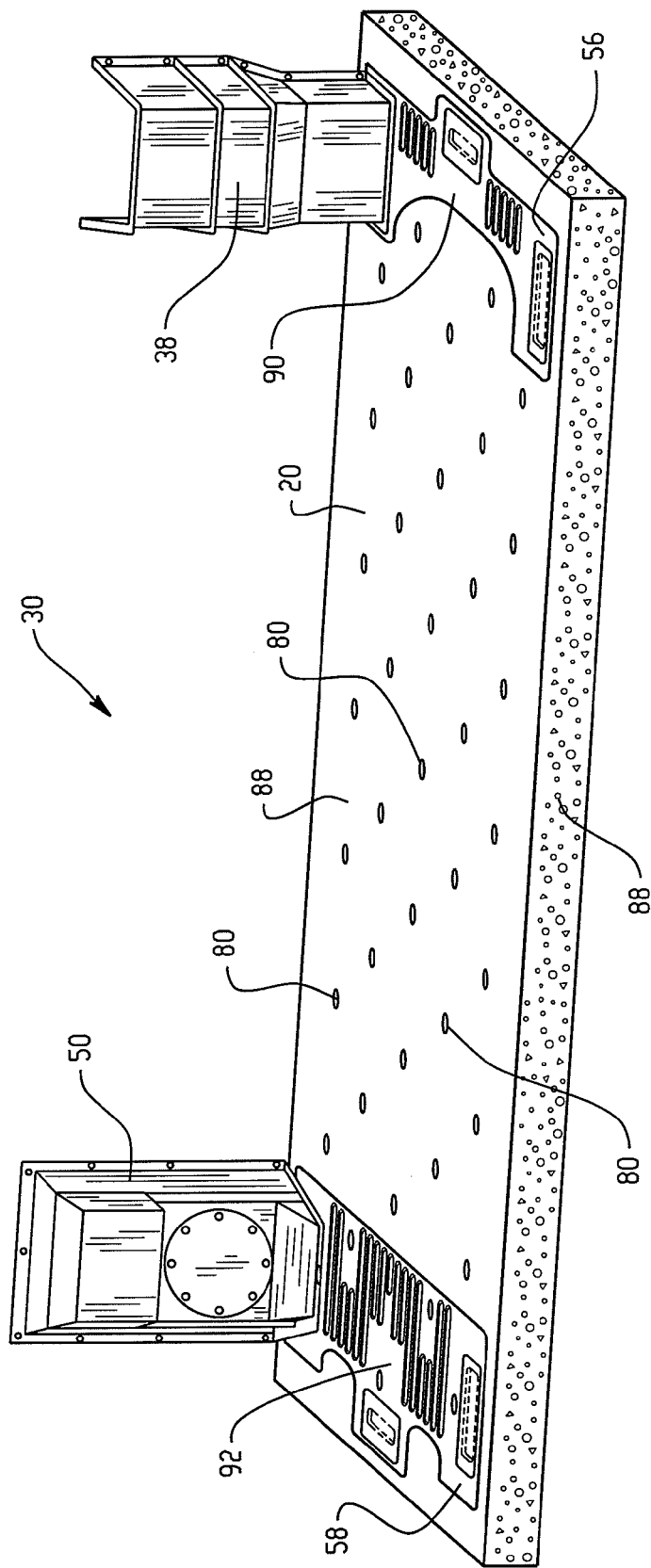
FIG. 7 is a perspective view of the flow control assembly of FIG. 3 incorporated into a floor of a containment structure.

Referring to FIG. 7, the pre-assembled flow control structure 30 is shown incorporated into the concrete 88 of the floor 20 (see also FIGS. 1 and 2) without the filter assemblies 22 connected thereto. As can be seen, the deck stub mounts 80b and upper surfaces 90 and 92 of the inlet reservoir housing 56 and outlet reservoir housing 58, respectively, are exposed at the surface of the floor 20. This exposure allows for connection (and, in some instances, relocation) of the inlet conduit 38, overflow conduit 50 and/or filter assemblies 22 to the pre-assembled flow control structure. In some embodiments, the pre-assembled flow control structure 30 is located within the vault and then the concrete is poured over the pre-assembled flow control structure as shown thereby forming the floor 20 of the vault. Then, the filter assemblies 22 are connected to the deck stub mounts 80b.

In some embodiments, the filter assemblies 22 are connected to the mounts 80a and 80b within the vault and then the structure is then transported to the site. This can provide more reliable installation of the cartridges prior to delivery to the site.

Figure 8:
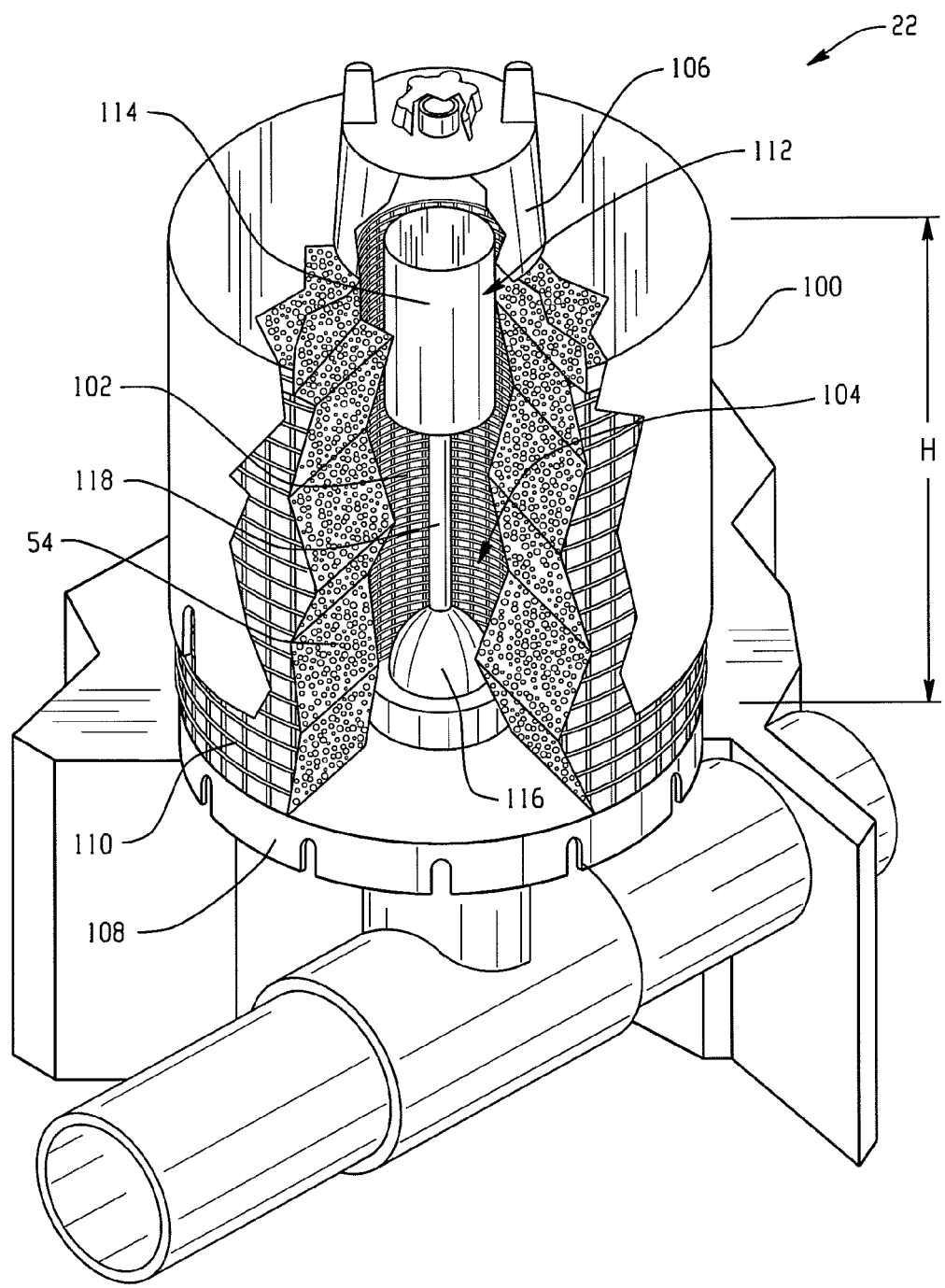
FIG. 8 is a section view of an embodiment of a filter assembly for use with the stormwater treatment system of FIG. 1.

Any suitable filter assembly may be used with the flow control structure 30. For example, referring to FIG. 8, a filter assembly 22 includes a hood 100 connected to a perforated or mesh center tube 102 having a drainage space 104 extending therethrough using an inner drainage space cap 106 that engages an upward extending end of the center tube. Inner drainage space cap 106 contains a mechanism (e.g., a one-way check valve) to promote the development of a siphon by permitting air to be expelled from beneath the hood 100 but preventing air from flowing back into the filter assembly 22 through the inner drainage space cap.

Center tube 102 is connected to a bottom pan 108 that forms a base for the filter assembly 22. A permeable outer screen 110 rests on the bottom pan 108, the outer screen extending vertically upward from the bottom pan and defining an annular volume between the center tube 102 and the outer screen. Flow through the filter assembly is controlled by a float valve assembly 112 that includes a buoyant float 114, a float valve body 116 and a linkage 118 joining the buoyant float and the float valve body. The float valve assembly 112 impedes or limits passage of stormwater from the filter assembly 22 when it is in its lowered position as illustrated.

Filter media 54 is located within the annular volume between the center tube 102 and the outer screen 110. In some embodiments, the filter media has a height of more than about 18 inches, such as about 27 inches or more. The filter assembly 22 generally relies on hydraulic pressure to initially force water through the filter media and the filter assembly is therefore at least partially submerged in stormwater during normal operation. As stormwater enters the filter assembly, infiltrates radially inward through the outer screen 110 and filter media 54, and into the drainage space, filtration occurs as the stormwater is strained through and comes into contact with the filter media. General operation of the filter assembly including siphon is similar to that described in pending U.S. Pat. Ser. No. 10/647,102, filed Aug. 21, 2003, the details of which are hereby incorporated by reference as if fully set forth herein. Various filter assembly features are also described in pending U.S. Pat. Ser. No. 11/746,249, titled "Stormwater Filter Assembly", filed on the same day as the instant application, the details of which are hereby incorporated by reference as if fully set forth herein.

The filter media 54 may be selected to efficiently remove contaminants by physical filtration. Additionally, the filter media may be selected to remove contaminants through mechanical action, chemical action, biological action, or by any suitable combination thereof. In one aspect, a screen such as outer screen 110 is a satisfactory physical filter without the presence of additional filter media. The filter assembly may be capable of high throughput, rapidly screening debris from large volumes of stormwater. Alternatively, the filter includes outer screen 110 and one or more types of filter medium that is selected for finer filtration, for appropriate chemical reactivity, or appropriate biological activity. Mixtures of different media types are optionally used to provide advantageous combinations of filtering ability.

The filter media 54 may be selected to remove heavy metals, oils and greases, organic toxins, and other contaminants that stormwater typically accumulates when flowing over paved areas in residential or industrial communities before entry into a stormwater treatment system. Alternatively, or in addition, the filter media 54 is selected to remove total or dissolved phosphorous or nitrogen from stormwater. Selected media include, without limitation, organic compost, vermiculite, activated carbon, peat, zeolite, perlite, diatomaceous earth, clay minerals, commercial ion exchange resins, catalyst-infused resins, silica sand, iron-infused media, or mixtures of these. The filter media 54 may be in the form of granules or pellets. Large granules provide the advantage of maintaining a high flow rate through the treatment bed by minimizing clogging of the bed that might otherwise arise from the accumulation of fine particulate debris. Alternatively, fine granules provide enhanced filtration of fine debris. The selection of pellet or granule size depends on the desired level of physical straining and treatment.

The filter assembly 22 optionally includes a cloth or paper filter, including pleated filters. The use of a cloth or paper filter either outside of or within the filter medium basket may be used to capture extremely fine particulates during filtration.

While the outer screen 54 is shown generally as a right circular cylinder in the illustrated embodiment, other configurations are contemplated. For example, an outer screen with an undulating, wavelike shape could be used to increase the filter surface area.

Figure 9:
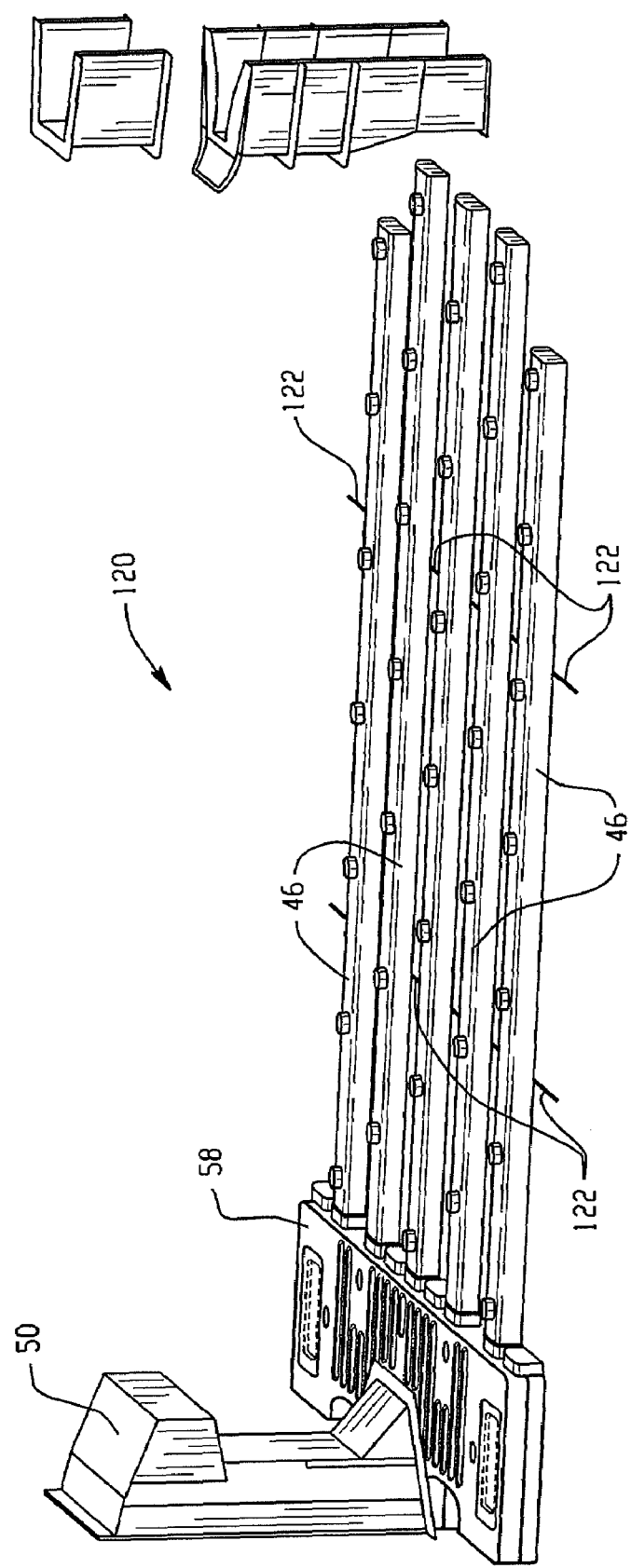
FIG. 9 is a perspective view of another embodiment of a pre-assembled flow control structure.

It is to be clearly understood that the above description is intended by way of illustration and example only and is not intended to be taken by way of limitation, and that changes and modifications are possible. For example, referring to FIG. 9, a flow control structure 120 is illustrated that includes many of the components described above, such as filter conduits 46, outlet compartment housing 58 and overflow structure 50, but does not include an inlet compartment housing. The flow control structure 120 also includes flume spacers 122 used to maintain an alignment of the conduits. Accordingly, other embodiments are contemplated and modifications and changes could be made without departing from the scope of this application as expressed by any claims now included or hereafter added.

What is claimed is:

1. A stormwater filtration system, comprising:
    a stormwater containment structure including a concrete floor and a pre-assembled flow structure embedded in the concrete floor, the pre-assembled flow structure including an inlet compartment housing, an outlet compartment housing, at least one filter conduit connected to the inlet compartment housing and the outlet compartment housing and in flow communication with the interior of the outlet compartment housing, at least one bypass conduit extending from the inlet compartment housing to the outlet compartment housing for delivering water from the interior of the inlet compartment housing to the interior of the outlet compartment housing;
    a plurality of filter units connected to the filter conduit so that stormwater filtered by the filter units passes into the filter conduit and then to the interior of the outlet compartment housing.

2. The stormwater filtration system of claim 1 wherein at least one filter unit has a portion extending over a top of the inlet compartment housing.

3. The stormwater filtration system of claim 2 wherein at least one filter unit has a portion extending over a top of the outlet compartment housing.

4. The stormwater filtration system of claim 3 further comprising at least one filter unit connected atop the outlet compartment housing to deliver filtered stormwater to the interior of the outlet compartment housing without entering the filter conduit.

5. The stormwater filtration system of claim 1 wherein the pre-assembled flow structure is formed of plastic, the inlet compartment housing includes an upper wall at an elevation proximate an upper surface of the concrete floor, the upper wall having first and second spaced apart inlets, the first inlet having a cover placed thereon, the second inlet connected to an upwardly extending inlet flow structure.

6. The stormwater filtration system of claim 5 wherein the inlet flow structure includes (i) a bypass orientation that directs stormwater flowing into the containment structure and into the interior of the inlet compartment housing so as to travel along the bypass conduits to the interior of the outlet compartment housing without filtering by the filter units and (ii) a filtering orientation that blocks stormwater flowing into the containment structure from entering the interior of the inlet compartment and traveling along the bypass conduit.

7. The stormwater filtration system of claim 1 wherein the outlet compartment housing includes an upper wall at an elevation proximate an upper surface of the concrete floor, the upper wall having multiple filter unit connection openings with respective filter units connected thereto to deliver filtered stormwater into the interior of the outlet compartment housing.

8. A flow assembly for use in forming a floor of a stormwater filtration chamber for containing multiple filter units, the flow assembly comprising:
    a first housing forming a stormwater inlet compartment;
    a second housing forming a stormwater outlet compartment;
    a plurality of filter conduits, each filter conduit having:
        a first end connected to the first housing in a manner that prevents stormwater from flowing from the inlet compartment into the first end;
        a second end connected to the second housing in a manner that permits stormwater to flow from the second end into the outlet compartment,
        a plurality of filter connection structures extending upwardly from the filter conduit;
    a plurality of bypass conduits, each having:
        a first end connected to the first housing in a manner that permits stormwater to flow from the inlet compartment into the first end;
        a second end connected to the second housing in a manner that permits stormwater to flow from the second end into the outlet compartment.

9. The flow assembly of claim 8 wherein the first housing further includes multiple inlet openings in an upper wall thereof.

10. The flow assembly of claim 9 wherein the second housing includes multiple outlet openings in an upper wall thereof.

11. The flow assembly of claim 10 wherein the second housing includes multiple filter connection point openings.

12. The flow assembly of claim 10, further comprising:
    an inlet flow structure extending upwardly from one of the inlet openings;
    an outlet overflow structure extending upwardly from one of the outlet openings.

13. The flow assembly of claim 8 wherein each of the first housing, second housing, filter conduits and bypass conduits is formed of plastic.

14. A method of manufacturing a stormwater filtration chamber, comprising:
(a) producing a flow assembly having:
a first housing forming a stormwater inlet compartment;
a second housing forming a stormwater outlet compartment;
at least one filter conduit having a first end and a second end, the first end connected to the first housing in a manner that prevents stormwater from flowing from the inlet compartment into the first end, the second end connected to the second housing in a manner that permits stormwater to flow from the second end into the outlet compartment, the filter conduit further including a plurality of filter connection structures extending therefrom;
at least one bypass conduit having a first end and a second end, the first end connected to the first housing in a manner that permits stormwater to flow from the inlet compartment into the first end, and the second end connected to the second housing in a manner that permits stormwater to flow from the second end into the outlet compartment;
(b) embedding the flow assembly in concrete to produce a floor for the filtration chamber.

15. The method of claim 14 wherein, in step (b), an upper wall of the first housing is left exposed and an upper wall of the second housing is left exposed.

16. The method of claim 14 wherein the upper wall of the first housing and the upper wall of the second housing are each substantially flush with an upper surface of the floor defined by concrete.

17. The method of claim 14 wherein step (b) is performed by precasting the floor at a first location, and the method includes the step of transporting the floor to an installation location.

18. The method of claim 17 wherein the floor is integrated with a wall structure prior to the transporting step.

19. A stormwater treatment system, comprising:
a stormwater containment structure including a floor;
a pre-assembled flow control structure that forms at least part of the floor, the pre-assembled flow control structure including an inlet portion, an outlet portion and a treatment region extending between the inlet portion and the outlet portion, the treatment region including a filter conduit for directing filtered stormwater toward the outlet portion;
filter cartridges connected to the filter conduit and in communication therewith so that filtered stormwater exiting the filter cartridges flows into the filter conduit and is directed toward the outlet portion; and
at least one filter cartride connected to the pre-assembled flow control structure at the inlet portion or the outlet portion.

20. The stormwater treatment system of claim 19, wherein the pre-assembled flow control structure has an initial configuration where stormwater bypasses the filter cartridges and a filtering configuration where stormwater is filtered by the filter cartridges, the pre-assembled flow control structure being configurable from the initial configuration to the filtering configuration.

21. The stormwater treatment system of claim 20 further comprising a bypass conduit for directing unfiltered stormwater from an inlet reservoir at the inlet portion toward the outlet portion.

22. The stormwater treatment system of claim 21, wherein the bypass conduit includes no filter assemblies connected thereto.

23. The stormwater treatment system of claim 20, wherein the pre-assembled flow control structure includes an inlet reservoir housing including an inlet reservoir and an outlet reservoir housing including an outlet reservoir at the outlet portion, the outlet reservoir being in communication with the filter conduit.

24. The stormwater treatment system of claim 23, wherein a filter assembly is connected directly to the outlet reservoir housing.

25. The stormwater treatment system of claim 23, wherein a filter assembly is connected directly to the inlet reservoir housing.

26. The stormwater treatment system of claim 23, wherein, with the pre-assembled flow control structure in its initial configuration, stormwater flows directly into the inlet reservoir from an inlet of the containment structure, through the filter conduit and into the outlet reservoir without entering the filter cartridges.

27. The stormwater treatment system of claim 19, wherein the stormwater containment structure includes an inlet through which stormwater enters the stormwater containment structure, the pre-assembled flow control structure including an inlet conduit arranged and configured to receive stormwater from the inlet and direct the stormwater to the inlet portion.

28. The stormwater treatment system of claim 19, wherein the stormwater containment structure includes an inlet through which stormwater enters the stormwater containment structure, the pre-assembled flow control structure including a dissipator structure arranged and configured to receive stormwater from the inlet and direct the stormwater toward the filter cartridges to filter the stormwater.

29. A stormwater treatment system, comprising:
a stormwater containment structure including a concrete floor and a pre-assembled flow control structure embedded in the concrete floor, the pre-assembled flow control structure including an outlet compartment housing including an upper wall extending between side walls of the outlet compartment housing, the upper wall at an elevation proximate an upper surface of the concrete floor, at least one filter conduit in communication with an interior of the outlet compartment housing; and
a plurality of filter assemblies connected to the filter conduit so that filtered water flows from the filter assemblies, into the filter conduit and toward the interior of the outlet compartment housing.

30. The stormwater treatment system of claim 29, wherein at least one filter assembly has a portion extending over the upper wall of the outlet compartment housing.

31. The stormwater treatment system of claim 30 further comprising at least one filter assembly connected atop the outlet compartment housing to deliver filtered stormwater to the interior of the outlet compartment housing without entering the filter conduit.

32. The stormwater treatment system of claim 29, wherein the pre-assembled flow control structure is formed of plastic, the upper wall having multiple filter assembly connection openings with respective filter assemblies connected thereto to deliver filtered stormwater into the interior of the outlet compartment housing.

* * * * *